United States Patent [19]

Vaughan

[11] Patent Number: 5,118,399
[45] Date of Patent: Jun. 2, 1992

[54] ELECTRODIALYTIC RECOVERY PROCESS

[76] Inventor: Daniel J. Vaughan, 36 Paxon Dr., Wilmington, Del. 19803

[21] Appl. No.: 399,936

[22] Filed: Aug. 29, 1989

Related U.S. Application Data

[63] Continuation-in-part of Ser. No. 183,040, Apr. 19, 1988.

[51] Int. Cl.$^5$ .............. B01D 61/44; C02F 1/469; C25B 7/00
[52] U.S. Cl. .............. 204/182.4; 204/151; 204/153; 204/301
[58] Field of Search .............. 204/182.4, 182.3, 182.5, 204/DIG. 13, 96, 98, 153, 151, 149, 152, 301

[56] References Cited

U.S. PATENT DOCUMENTS

| | | | |
|---|---|---|---|
| 4,111,772 | 9/1978 | Horn | 204/182.4 |
| 4,203,822 | 5/1980 | Schenker et al. | 204/182.4 X |
| 4,519,881 | 5/1985 | Chang | 204/182.4 X |
| 4,636,288 | 1/1987 | Vaughan | 204/182.4 |

FOREIGN PATENT DOCUMENTS

| | | | |
|---|---|---|---|
| 0016859 | 2/1977 | Japan | 204/182.4 |
| 0070882 | 4/1983 | Japan | 204/182.4 |
| 191501 | 1/1967 | U.S.S.R. | |
| 810854 | 3/1981 | U.S.S.R. | 204/96 |
| 1054308 | 11/1983 | U.S.S.R. | 204/153 |

Primary Examiner—John Niebling
Assistant Examiner—John S. Starsiak, Jr.
Attorney, Agent, or Firm—Slesinger, Arkwright & Garvey

[57] ABSTRACT

A multivalent metal hydroxide is separated as a solid from an alkali hydroxide or from another multivalent metal hydroxide in an electrodialytic cell. The separation process is regulated by varying the pH or concentration of alkali hydroxide in a feed compartment electrolyte by matching the rate alkali cations are fed and removed from the electrolyte. As a result, one multivalent metal cation separates as a solid in the feed electrolyte or one multivalent cation separates as a solid and one multivalent cation is ionically mobile and electro-transportable from the electrolyte. This electrodialytic method can be used to continuously regenerate sodium hydroxide etchants containing dissolved aluminum, when the dissolved aluminum is removed from the etchant as a solid and the sodium hydroxide is returned as a solution for etching.

22 Claims, No Drawings

ELECTRODIALYTIC RECOVERY PROCESS

FIELD OF THE INVENTION

This application is a continuation-in-part application of U.S. Ser. No. 183,040, filed Apr. 19, 1988.

This invention relates broadly to a process for separation of a multivalent metal hydroxide from an alkali hydroxide in sols, gels, colloidal dispersions or solutions of the hydroxides. More specifically, this invention relates to an electrodialytic process for separation of sols, gels, dispersions or solutions of multivalent metal hydroxides and alkali hydroxides by electrotransport of alkali cations from a sol, gel, dispersion or solution.

Specifically, this invention relates to an electrodialytic process using an electrodialytic cell for separation of multivalent metal hydroxides and separation of multivalent metal hydroxides from alkali hydroxides in an electrolyte wherein the pH or concentration of alkali hydroxide of said electrolyte is controlled by electrotransport of alkali cations from said electrolyte at the rate alkali cations enter said electrolyte whereby a multivalent metal hydroxide in a sol, gel, dispersion or solution feed is separated as a solid in the electrolyte or a multivalent metal hydroxide is separated as a solid and a multivalent metal hydroxide is converted to a salt having an ionically mobile cation. The ionically mobile cation is electrotransported through a cation permeable membrane to a catholyte solution in which the electrotransported alkali cations are converted in the catholyte solution to an alkali hydroxide. The result is an electrodialytic method for separation of multivalent metal hydroxides, and an efficient method for restoring and reforming alkali hydroxide etchants of aluminum and other sols, gels, dispersions or solutions containing multivalent and alkali hydroxides.

One embodiment of the process of this invention relates to an electrodialytic process comprising an electrodialytic cell having an anolyte compartment and a catholyte compartment separated by a cation permeable membrane. The anolyte compartment contains an anode and an anolyte of an aqueous solution comprising an alkali hydroxide with or without a soluble anion of an acid. The catholyte compartment contains a cathode and an aqueous solution of an alkali hydroxide.

A sol, gel, dispersion or solution comprising an alkali hydroxide and a multivalent hydroxide is fed continuously to the anolyte compartment of the cell. Alkali cations are continuously electrotransported from the anolyte through the cation permeable membrane into the catholyte at a rate to control the concentration of alkali hydroxide or pH in the anolyte to cause separation of a multivalent metal hydroxide in the anolyte that is removable from the anolyte as a solid.

This embodiment is especially useful for reforming alkali hydroxide etchants of aluminum and aluminum alloys by separation of aluminum and other hydroxides from the anolyte and return of the alkali hydroxide and additives to the etchant solution.

Another embodiment of the electrodialytic process of this invention relates to an electrodialytic process comprising an electrochemical cell having at least three compartments that are separated by cation permeable membranes. The cell has an anolyte compartment containing an anode and an aqueous anolyte, a feed compartment comprising an alkali hydroxide with or without a soluble anion of an acid, and a catholyte compartment containing a cathode and a catholyte of an aqueous solution of an alkali hydroxide. A sol, gel, dispersion or solution comprising an alkali hydroxide and a multivalent metal hydroxide is fed continuously to the feed compartment and alkali cations are continuously electrotransported from the feed compartment electrolyte into the catholyte at a rate to control the concentration of alkali hydroxide or pH in the feed compartment electrolyte whereby a multivalent metal hydroxide is separated as a removable solid in the feed compartment electrolyte. This embodiment is especially useful when the feed to the elctrodialytic process contains oxygen sensitive organics or substances that coat and foul anodes.

Another embodiment of the process of this invention relates to an electrodialytic process comprising an electrodialytic cell having at least three compartments separated by cation permeable membranes. The cell has an anolyte compartment containing an anode and an aqueous anolyte comprising a soluble anion of an acid, a reactor compartment containing (a) a soluble salt of an acid which acid in a one normal solution would have a pH no greater than three and forms a water soluble salt of a multivalent metal cation and (b) an agent capable of reacting with a multivalent metal cation to form ionically immobile substances selected from precipitates, complexes and chelates of multivalent metal cations, and a catholyte compartment containing a cathode and an aqueous solution of an alkali hydroxide. A sol, gel, dispersion or solution comprising an alkali hydroxide and at least two multivalent metal hydroxides is fed continuously to the anolyte and alkali cations are continuously electrotransported from the anolyte at a rate to control the pH of the anolyte whereby a multivalent metal hydroxide is separated as a removable solid in the anolyte and a multivalent metal cation is electrotransported from the anolyte into the reactor compartment and ionically immobilized and the alkali cations are elctrotransported to the catholyte. This embodiment is especially useful for separating multivalent metal hydroxides and for the conversion of salts of molybdic, tungstic and other metallic oxides-acidic to acids without fouling the ionic transport of cation permeable membranes with salts or hydroxides of multivalent metal cations and recovery of substantially pure alkali hydroxide.

The electrodialytic processes of the instant invention are especially useful for restoring and purifying alkali hydroxide etchants of aluminum and aluminum alloys, for selective separation of multivalent metal hydroxides and for recovery of metallic oxides-acidic from alkali hydroxide in sols, gels, dispersion or solutions.

BACKGROUND OF THE INVENTION

Electrodialysis is a well known art (see U.S. Pat. Nos 4,325,792, 4,439,293, 4,636,288, 3,394,068, 4,080,270, 4,111,772, 4,203,822, 4,519,881 the disclosure of which are incorporated by reference). Electrodialysis is the electrotransport of ions through ion permeable membranes as a result of an electrical driving force. The process is commonly carried out in an electrochemical cell having a catholyte compartment containing a cathode and a catholyte and an anolyte compartment containing an anode and an anolyte, the catholyte and anolyte compartments being separated by ion permeable membranes.

The electrotransport of sodium and other alkali metal cations through cation permeable membranes is a well known art. The electrotransport of multivalent metal cations through cation permeable membranes into an electrolyte that comprises agents, including hydroxyl ions, that insolubilize multivalent metal cations, is disclosed in U.S. Pat. No. 4,636,288. The multivalent metal cations were soluble in the aqueous acidic solution and the cations were sufficiently mobile for electrotransport through a cation permeable membrane. The electrodialytic processes of U.S. Pat. No. 4,636,288 could be operated either as a batch process or as a continuous process with little difference in the results. Conversion of the multivalent metal cation salts resulted in forming the acid of the salt anion and the base of the salt cation. The electrical conductivity and acidity of the solution comprising the multivalent metal salts increased with increasing conversion. In contrast to acidic solutions of multivalent metal salts, multivalent metal cations in alkaline solutions are substantially insoluble hydroxides, the multivalent metal cations are not generally ionically mobile, the hydroxyl ion does not form an ionically conductive acid and the solution becomes essentially non-conductive electrically when the alkali hydroxide is depleted.

Many of the hydroxides of heavy metals, such as aluminum, lead, tin, zinc, gallium and tungsten are soluble or appear to be soluble in excess of sodium or potassium hydroxide. This has been attributed to the formation of salts, the hydroxides behaving as amphoteric substances and giving either $OH^-$ or $H^+$ ions according to the condition of the experiment. For example, when aluminum hydroxide is dissolved in sodium hydroxide, sodium aluminate is supposed to be formed. It is possible, however, that the solution of the aluminum is not so much a matter of compound formation as a peptization of the hydroxide to form a sol, gel or colloidal dispersion. It is of course, difficult to mechanically separate the multivalent metal hydroxide from an alkali hydroxide gel, sol, solution or colloidal dispersion.

When a metal has several oxides, the basic properties of the hydroxides become less pronounced as the valency of the metal increases. When a certain limit of valency is reached, the basic properties disappear almost completely and salt formation does not take place to an appreciable extent. The acidic oxides are formed only by those metals which can exert a high valency and thus combine with several oxygen atoms. The acidic tendency is almost invariably in the unequivalent and higher valence of the metal. Hence metals in the right hand half of the periodic table give acidic oxides that form salts with alkali metal cations. These acids or multivalent metal hydroxides, metallic oxides-acidic, such as molybdic, tungstic, uranic, vanadic niobic and tantalic, cannot always be isolated in pure form by neutralization of the salts as they are frequently converted to anhydrides or polymerized or dissolved in excess of the neutralizing acid. These acids are made from a lower oxide of the metal by heating the oxide with alkali, usually in the presence of an oxidizing agent. The excess alkali is removed by neutralization with an acid to form a soluble alkali salt.

In many uses of alkali hydroxides, excess of the alkali hydroxide is used, resulting in the formation of gels, sols, dispersions and solutions. This is especially the case for sodium hydroxide etchants of aluminum and alloys of aluminum. Aluminum is usually etched in a 15% to 30% solution of sodium hydroxide at temperatures above 80 C until about 20 to 30 grams of aluminum is etched per liter of etchant. The aluminum appears to be dissolved and seeding and cooling results in a very limited removal of sodium aluminate or aluminum hydroxide by filtration of the etchant. Since the etching rate decreases as the aluminum is etched and then accumulates in the sodium hydroxide solution, it is necessary to replace the etchant to maintain relatively lo concentrations of aluminum. The alloys of aluminum contains copper, silicon and other metals that are etched into the sodium hydroxide etchant and form a smut or slime or solution. To facilitate the etching process additives of sulfur, amines and wetting agents are used in the sodium hydroxide etchant. It would be desirable that the etchant be continuously restored to maintain a desired milling rate and quality of the milled alloys. It is an objective of the instant invention to provide a continuous process for purification and restoration of alkali hydroxide etchants used for etching aluminum and aluminum alloys.

It is known that the alkali hydroxide etchants can be neutralized or acidified with an acid, such as sulfuric, and thereby the aluminum hydroxide separated by filtration. The resulting salt solution can be electrodialytically converted to the acid of the salt anion and hydroxide of the alkali cation as disclosed in U.S. Pat. No. 4,636,288. The acid could be used again to neutralize the etchant and the alkali hydroxide returned to the etchant. This two step process requires that all of the alkali cations be converted to a salt and then the salt be electrodialytically converted to the alkali hydroxide for return to the etchant and that all additives must be recovered in the electrodialytic salt conversion step. The filtrate, salt, solution, obtained in removing the aluminum hydroxide, contains calcium, magnesium, and other multivalent metal cations that must be removed from the filtrate to prevent fouling of the cation permeable membranes when electrodialytically processing the filtrate or an electrodialytic well having three or more compartments must be used. It would be preferable that the alkali hydroxide etchant be restored in a one step process whereby the unwanted aluminum and other metal hydroxides are continuously separated from the etchant and the alkali hydroxide and additives returned to the etchant. It is an object of the instant invention to provide a continuous electrodialytic process for purification and restoration of alkali hydroxide etchants of aluminum.

The elctrodialytic conversion of salts of multivalent metal cations in aqueous solutions with or without admixture with salts of monovalent metal cations comprises the electrotransport of multivalent metal cations through cation permeable membranes whereby the multivalent salts are converted to the acids of the salt anions and insoluble hydroxides, salts or substances of the multivalent metal cations. The electrotransport of a multivalent metal cation is facilitated by the use of a salt of an acid in the electrolyte into which the multivalent metal cation is electrotransported.

When electrodialytically converting mixtures of alkali and multivalent metal salts, the multivalent metal cations are electrotransported from an electrolyte to a reactor electrolyte where the multivalent metal cations are ionically immobilized and the alkali cations are electrotransported from the reactor compartment to a catholyte of an aqueous solution of an alkali hydroxide. Although the process disclosed in U.S. Pat. No. 4,636,288 provide a means for separating multivalent metal cations and alkali cations, they do not provide a means for electrodialytically separating multivalent metal hydroxides or metallic oxides-acidic as removable solids from a feed compartment electrolyte when the feed comprises an alkali hydroxide or a method for electrodialytically separating multivalent metal hydroxides.

It is a feature of this invention to provide an electrodialytic process for separating multivalent metal hydroxides from alkali hydroxides and the electrodialytic separation of multivalent metal hydroxides whereby a multivalent metal hydroxide is separated as a removable solid in an electrolyte and a multivalent metal cation is electrotransported from the electrolyte.

SUMMARY OF THE INVENTION

This invention provides an electrodialytic process for separation of multivalent metal hydroxides and for separation of multivalent metal hydroxides from alkali hydroxides. The separation comprises passing electricity through an electrodialytic cell compartmented with cation permeable membranes, feeding a Sol, gel, dispersion or solution of alkali and multivalent hydroxides to an electrolyte in a compartment of the electrodialytic cell, electrotransporting alkali cations from the electrolyte at a rate to control the concentration of alkali hydroxide or pH of the electroyte whereby a multivalent hydroxide in the feed separates as a solid in the electrolyte and a multivalent metal hydroxide is converted to a salt having an ionically mobile multivalent cation that is electrotransported from the electrolyte to separate multivalent metal hydroxides and a multivalent metal hydroxide separates as a solid in the electrolyte and alkali cation or electrotransported from the electrolyte to separate multivalent and alkali hydroxides. The process of this invention is especially useful for reforming and restoring alkali hydroxide etchants of aluminum and aluminum alloys.

DETAILED DESCRIPTION OF THE INVENTION

For cations to be electrotransported through a cation permeable membrane, they must be soluble (ionically and mobile) in a solution, enter the membrane at the interface of the solution and membrane, be ionically mobile through the membrane structure and exit the membrane into the aqueous solution in the catholyte. All of these requirements are easily met for electrodialysis of alkali cations. The electrotransported alkali cations form water soluble salts and hydroxides that do not foul cation permeable membranes, and if there were no ionically mobile multivalent metal cations in an electrolyte, alkali cations could be removed from an electrolyte without any fouling of a cation permeable membrane. Unfortunately, most aqueous solutions contain calcium, magnesium and other multivalent metal cations in sufficient concentrations under some conditions of electrodialysis to cause fouling of membranes. The presence of only 1 to 3 ppm of calcium ion in sodium chloride brine was sufficient to cause fouling of cation permeable membranes in chlor-alkali production. The solubility of calcium hydroxide in water and alkali hydroxide solutions ranges from about 1.85 g/liter to 0.75 g/liter. In contrast to alkali cations, multivalent metal cations form substantially water insoluble hydroxides and salts with some anions of acids and also tend to be ionically immobile in alkali hydroxide solutions. The pH at which a multivalent metal hydroxide is converted to an ionically mobile multivalent cation in sufficient concentration to foul cation permeable membrane is different for each multivalent metal hydroxide. It appears that the pH at which a multivalent metal cation begins to form a hydroxide in a 0.03 molar solution of a salt of the multivalent cation is a good approximation. The acid anion associated with the multivalent metal cations will affect solubility of the multivalent metal cation and the pH at which hydroxide formation begins. The approximate pH at which hydroxides begin to be precipitated from a 0.03 molar solution of salts is: Mg 10.5, $Mn^{++}$ 8.8, Nd 7.0, $Zn^{++}$ 7.1, $Co^{++}$ 6.8, $Ni^{++}$ 6.7, $Pb^{++}$ 6.7, $Fe^{++}$ 5.7, $Cu^{++}$ 5.5, $Cr^{+++}$ 5.3, $Al^{+++}$ 4.1, $Sn^{++}$ 2.0, $Fe^{+++}$ 2, $Ti^{++++}$ 2. When the pH in an electrolyte solution is equal or lower than the pH, where hydroxides precipitate from salts, a multivalent metal cation of the salt becomes ionically mobile and, if conditions permit, will foul or be electrotransported through a cation permeable membrane.

In electrodialysis of an alkali hydroxide solution with no soluble anion of an acid in the solution, the pH of the solution can not be less than seven. The electrical conductivity of the electrolyte decreases with alkali hydroxide concentration below a pH of 14 and becomes non-conductive when all the alkali hydroxide has been electrodialytically removed from the electrolyte. When an alkali hydroxide solution comprises a soluble anion of an acid, the pH of an electrolyte can be electrodialytically varied from a pH of 14 to the pH of the acid of the anion and the electrical conductivity of the solution varied by the concentration of the soluble anion of an acid.

When a multivalent metal cation becomes ionically mobile in an electrolyte, it can react with sulfonate, carboxylate and other immobile anions of the cation permeable membrane to form a salt and be electrotransported into an electrolyte in electrical communication with the cell cathode if the multivalent metal cation does not react with a hydroxyl or acid anion to form an insoluble salt in the membrane or on the surface of the membrane facing the electrolyte in communication with the cathode. There must be a liquid junction between the solid cation permeable membrane and the electrolyte to provide solubility of the multivalent metal cation through the membrane and into the electrolyte. This liquid junction is provided by an acid that forms a soluble salt with multivalent metal cations or a salt of an acid that facilitates electrotransport of multivalent metal cations. In the processes of this invention, it is preferable to provide the liquid junction, when required, with an acid when the feed electrolyte has a pH above about 3 and with a salt of an acid at a pH less than 3. If a liquid junction is not required, the electrolyte in communication with the cathode can be a solution of alkali hydroxide.

The electrodialytic processes of this invention are continuous processes wherein alkali cations are continuously removed from an electrolyte at a rate to control the alkali hydroxide concentration or pH of an electrolyte to cause a multivalent metal hydroxide to separate in the feed electrolyte as a removable solid. It will be apparent to those skilled in the art that the rate of electrotransport of alkali cations will depend on the composition of the feed entering the feed compartment electrolyte and the concentration of alkali hydroxide or pH of the feed electrolyte. The alkali hydroxide sol, gel or dispersion must contain a multivalent metal hydroxide or metallic oxide-acidic that becomes a removable solid at the alkali hydroxide concentration or pH of the feed electrolyte. For example, if the alkali hydroxide sol contains only aluminum hydroxide, the feed electrolyte can be a dilute solution of sodium hydroxide at a pH of 14 or the electrolyte could contain a soluble anion of an acid, i.e., sulfate, and be at a pH greater than 5.0 and the electrolysis could be carried out in a two compartment electrodialytic cell with the anolyte compartment being the feed compartment and the catholyte compartment containing an aqueous alkali hydroxide. If the alkali hydroxide sol, for example, contains $Zn^{++}$, $Ni^{++}$, $Pb^{++}$ and $Fe^{+++}$, the feed electrolyte could be a dilute solution of alkali hydroxide or a solution comprising an anion of an acid at a pH greater than about 8 and all of the metal hydroxides removed as solids or the feed electrolyte could be at a pH greater than 2 but less than about 5 and the $Fe^{+++}$ removed as a solid and the other metal cations electrotransported through a cation permeable membrane. Preferably, the multivalent metal cations electrotransported are insolubilized in a reactor compartment of a three or more compartmented electrodialytic cell and the alkali cations converted to a substantially pure alkali hydroxide in a catholyte compartment. Salts of metallic oxides-acidic can usually be separated as solids in dilute alkali solutions and the salts converted to acids at a pH less than 7. At a pH of about 9 or less, it is preferable that the feed electrolyte comprises a soluble anion of an acid capable of operating at the pH desired for selected or complete removal of multivalent metal cations.

The processes of this invention can be carried out wherein all alkali cations fed to a feed electrolyte are not electrotransported from the electrolyte. For example, some of the electrolyte could be filtered to remove solids and the filtrate returned to a process for use. Partial recycle of the alkali hydroxide fed to the electrolyte enhances the energy efficiency of the electrodialytic process and permits recycle of additives, especially amine, and sulfur additives used in etching aluminum and aluminum alloys.

A soluble anion of an acid can be used in the electrodialytic processes of this invention to electrodialytically vary and maintain pH of an electrolyte and to increase the electrical conductivity of an electrolyte comprising a very dilute solution of alkali hydroxide. Any soluble anion of an acid or salt can be used. Preferably, the anion is an anion of an acid which acid in a one normal solution would have a pH no greater than 3 and forms a soluble salt with a multivalent metal cation. The preferred acids are acids of sulfur, halogen, nitrogen, phosphorus and carbon which acids in a 0.1 normal solution would have a pH of less than 3. The concentration of the soluble anion or mixture of anions can be varied as will be apparent to one skilled in the art. The concentration of the salt must be sufficient to effect the desired pH and electrical conductivity in the feed electrolyte. The anion can be added as an acid, a soluble salt, or a salt that forms a soluble ionically mobile anion when added to the electrolyte.

The electrodialytic cells of this invention can have two or more compartments. A two compartment cell has an anolyte and a catholyte compartment separated by a cation permeable membrane. The anolyte compartment has an anode and an aqueous anolyte comprising a solution of an alkali hydroxide with or without a soluble anion of an acid to which is added a sol, gel, dispersion or solution comprising an alkali hydroxide and a multivalent metal hydroxide. The catholyte compartment has a cathode and an aqueous solution of alkali hydroxide.

A three compartment cell of this invention has an anolyte compartment, a feed or reactor compartment and a catholyte compartment separated by cation permeable membranes. The anolyte compartment has an anode and an aqueous anolyte. The reactor or feed compartment has an electrolyte with or without a soluble anion of an acid and with or without agents that ionically immobilize multivalent metal cations. The catholyte compartment has a cathode and an aqueous solution of alkali hydroxide. A sol, gel, dispersion or solution comprising an alkali hydroxide and a multivalent metal hydroxide is fed to the anolyte compartment or to the feed compartment. Cells of this invention can have more than three compartments separated by all cation permeable membranes or combinations of action, anion, bipolar membranes and porous separators provided that the membranes between the feed compartment and the catholyte compartment are cation permeable membranes.

Any cation permeable membrane can be used to separate the compartments of the electrodialytic cells of this invention. The cation permeable membranes have fixed negative charges distributed in a polymer matrix and are permeable to positively charged ions. The membranes are preferably membranes of hydrocarbon and halocarbon polymers containing acid and acid derivatives. Particularly suitable acid polymers are perhalocarbon polymers containing pendant sulfonic acid, sulfonamide and carboxylic acid groups. The membranes may be a multi-layered structure of different polymers and contain fillers, reinforcements and chemical modifiers. The preferred membranes are substantially chemically stable to the process conditions and mechanically suitable for design and economical operation of the electrodialytic process. The preferred membranes have high electrical conductivity and high electrotransport of alkali metal cations. The most preferred membranes are perfluorocarbon membranes, such as NAFION, manufactured by E. I. duPont Company, that contain sulfonic, carboxylic or sulfonamide groups. Preferably, the membrane separating the catholyte compartment from other cell compartments has a high electrotransport of alkali metal cations and is suitable for making various concentrations of alkali hydroxide solutions. A membrane with high water transport is preferable for dilute alkali hydroxide solutions and a membrane with low water transport is preferable for making concentrated alkali hydroxide solutions.

The alkali hydroxide of this invention can be a hydroxide of the alkali metals or ammonium. Preferably, the alkali hydroxide is sodium or potassium hydroxide.

A multivalent metal hydroxide of this invention is any hydroxide or metallic oxide-acidic of a multivalent metal that is substantially insoluble in water or dilute alkali hydroxide solutions.

One embodiment of the process of this invention is the restoration of alkali hydroxide etchants, especially sodium hydroxide etchants, for chemical milling of aluminum and aluminum alloys in an electrodialytic cell. To illustrate the practice of this aspect of the invention, an electrodialytic cell was assembled having an anolyte compartment containing an anode and an aqueous anolyte and a catholyte compartment containing a cathode and catholyte, an aqueous solution of sodium hydroxide. The compartments were separated by a cation permeable membrane. The cell had an electrolysis area of nine (9) square inches and was equipped for continuously adding feed to the anolyte and filtering solids from the anolyte and returning the filtered anolyte to the anolyte compartment. The catholyte compartment was equipped to continuously remove catholyte at a controlled concentration with water addition when necessary. The anode was made of a titanium mesh with an iridium oxide coating obtained from the Electrode Corporation. The cation permeable membrane was NAFION 417 that was obtained from the duPont Company. The cathode was a copper mesh electrocoated with nickel. The total anode to cathode gap was 0.3 inches, the cell temperature 80 degrees C. to 90 degrees C., the current density 2 amperes per square inch. Cell voltage was the total anode to cathode voltage. The power supply was custom made and equipped to run at constant current and variable voltage. The volume of the anolyte compartment was 3000 ml. and the catholyte compartment 500 ml. at overflow to storage.

EXAMPLE 1

The anolyte compartment was filled with a five (5) weight percent solution of sodium hydroxide and the catholyte compartment with a five (5) weight percent solution of sodium hydroxide. The initial cell voltage was 3.8. A sodium hydroxide etchant containing 21 wt.% sodium hydroxide and 38 grams per liter of dissolved aluminum was continuously fed to the anolyte compartment at a rate to maintain a 3 wt.% sodium hydroxide solution in the anolyte and aluminum hydroxide was continuously precipitated, filtered and removed from the anolyte and dried and weighed. The cell voltage remained at 3.9 volts throughout the one hour operation. Essentially, 100% of the sodium cations in the etchant feed was recovered as sodium hydroxide in the catholyte and over 99% of the aluminum dissolved in the etchant was recovered as aluminum hydroxide. After about one hour of electrodialysis, the anolyte was changed to a 10 wt.% solution of sodium sulfate and the feed of etchant continued at a rate to maintain the pH of the anolyte at 13. The cell voltage was 4.1 and constant. Aluminum hydroxide was continuously precipitated, filtered and removed from the anolyte. Essentially all sodium cations and aluminum in the etchant feed were recovered as aluminum hydroxide and sodium hydroxide. After one hour, the addition rate of etchant feed to the reactor compartment was adjusted (slightly reduced) to effect reducing the pH of the anolyte to a pH of 10. The cell voltage was 4.1 and essentially constant. Aluminum hydroxide was continuously precipitated, filtered and removed from the anolyte. The recovery of dissolved aluminum and sodium hydroxide was essentially 100%. After one hour of operation, the anolyte was changed to a 5 wt.% solution of sodium hydroxide and the etchant feed to an etchant of 28 wt.% sodium hydroxide solution containing 50 grams of a dissolved aluminum alloy of 6 wt.% copper and 6.5 volume % of a Dapco solution containing triethanol amine and alkali sulfides. The etchant was fed continuously to the anolyte at a rate to maintain about 3 wt.% sodium hydroxide in the anolyte. Aluminum hydroxide containing copper was continuously precipitated in the anolyte. The precipitate was filtered from the anolyte, washed to remove amine and sulfur additives, dried and weighed. Essentially 100% of the dissolved aluminum and copper, calculated as cupric oxide, was recovered. Water was continuously added to the anolyte to provide for removal of anolyte to control the concentration of amine, sulfur and other additives in the anolyte. The removed anolyte could be returned to the etching solution and concentrated to etchant strength. A material balance showed that about 20% of the sodium hydroxide in the feed was removed as anolyte and about was recovered in the catholyte. There were no observed problems in electrodialysis with the additives. No attempt was made to optimize hydroxide removal between anolyte and catholyte.

These examples show that sodium hydroxide etchants of aluminum and aluminum alloys with and without additives can be restored electrodialytically by feeding a used etchant to a feed electrolyte (anolyte) having a concentration of sodium hydroxide or pH whereby aluminum hydroxide precipitates as a removable solid and the concentration or pH of the anolyte is electrodialytically controlled by electrotransport of sodium cations from the anolyte into a catholyte.

EXAMPLE 2

One embodiment of the process of this invention is the separation of two or more multivalent metal hydroxides in an alkali sol, gel, dispersion or solution whereby a multivalent metal hydroxide is solubilized in the feed electrolyte and the resulting multivalent metal cations are electrotransported from the feed electrolyte. To illustrate the practice of this aspect of the instant invention an electrodialytic cell having four compartments was assembled: an anolyte compartment containing an anode and a aqueous anolyte composing an acid or sol of an acid, two reactor compartments with electrolyte but without electrodes and a catholyte compartment containing a cathode and an aqueous solution of alkali hydroxide. The compartments were separated by cation permeable membranes. The four compartment cell was assembled by adding two reactor compartments to the two compartment cell in Example 1. The anolyte and catholyte compartments were the same, except for the anolyte. Each reactor compartment was equipped for controlling pH, removing solids and adding chemicals to effect the ionic mobility of multivalent metal cations. The electrolyte volume for each compartment was 200 ml. The spacing between electrodes was 0.65 inches. The compartments were separated by NAFION 324 membranes obtained from the duPont Company. The electrolytes were a 10 wt.% solution of sodium sulfate anolyte, a 3 wt.% sulfuric acid reactor compartment one, a 10 wt.% sodium sulfate, 1 wt.% sodium hydroxide and 0.1 wt.% sodium hydroxide catholyte. A solution comprising 25 wt.% sodium hydroxide, 20 g/l dissolved aluminum, 1.2 g/l copper, 2.4 g/l zinc, 1.5 g/l calcium and 2.4 g/l magnesium was fed continuously to the anolyte having a pH of 3.5 and the sodium hydroxide concentration of reactor compartment number two was controlled by addition of sodium hydroxide from the catholyte. Aluminum hydroxide continuously precipitated in the anolyte and was removed by filtration; zinc, magnesium, copper and calcium hydroxides and probably some oxalates were precipitated in reactor compartment number two and sodium hydroxide was formed in the catholyte. After two hours o electrolysis, about 98% of the aluminum was recovered as aluminum hydroxide and about 95% of the copper, zinc, and magnesium was recovered in the reactor compartment number two and 97% of the sodium hydroxide was recovered as catholyte.

The run was discontinued and the feed changed to a solution containing 5 wt.% sodium hydroxide, 20 g/l ferric hydroxide and 10 g/l of cupric hydroxide; the reactor compartment electrolytes and catholyte were the same. The sodium hydroxide solution was fed continuously to the anolyte at a rate to maintain a pH of 2.4–2.6 in the anolyte. Ferric hydroxide was continuously filtered from the anolyte and copper hydroxide was formed in reactor compartment number two. The ferric hydroxide contained traces of copper that was removed by washing the precipitate with a 2.5 pH solution of sulfuric acid. Over 98% of the ferric hydroxide was recovered, 94% of the copper (some in reactor compartment number one) and essentially all of the sodium hydroxide.

EXAMPLE 3

The electrodialytic cell of example 2 was converted to a three compartment cell by removing one reactor compartment. The anolyte was a 3 wt.% solution of sulfuric acid, the reactor compartment electrolyte a 5 wt.% solution of sodium hydroxide and the catholyte a 10 wt.% solution of sodium hydroxide. A sodium hydroxide etchant comprising 30 grams of dissolved aluminum alloy of 6 wt.% copper and 6.5 volume % of a Dapco solution containing triethanol amine and alkali sulfides. The etchant was fed continuously to the reactor compartment at a rate to maintain a 5 wt% sodium hydroxide solution. Aluminum and copper and other metal hydroxides were continuously precipitated in the reactor electrolyte and removed by filtration and sodium hydroxide was recovered in the catholyte. The filtrate, reactor compartment solution, contained triethanol amine about 90% of that in the etchant and sulfides and some sulfur. Part of the filtrate was removed and replaced with a 5 wt.% solution of sodium hydroxide when the concentration of triethanol and sulfide additives had increased to about 3× the initial concentration. There was no apparent degradation of the additives and the filtrate was essentially free of metal hydroxides and could be returned to the etchant. There was no fouling of the anode or membrane. The cell voltage remained at 5.5 volts throughout the two (2) hour operation.

After completion o the etchant feed the reactor compartment solution was changed to a solution of 9 wt.% sodium sulfate and 1 wt.% sodium oxalate and adjusted to a PH of 9 with sodium hydroxide. A feed solution containing 30 g/l of sodium molybdate and 180 g/l of sodium hydroxide was fed to the anolyte compartment and the PH of the anolyte adjusted to a pH of 4. A yellow white precipitate separated int he anolyte and slowly became a solid that was removed by decantation. There was no apparent operational problems of anode or membrane fouling. The reactor compartment solution contained some precipitates indicating the presence of calcium and other multivalent metal cations. The complexity of the molecular structure of molybdate oxides and salts precluded a complete compound and material balance, however, about 95% of sodium cations were recovered in the catholyte as hydroxide and there was no loss of molybdenum compounds in the reactor compartment. The yellow-white solid was dried and found to be about 80% molybdic acid.

The anolyte was changed to remove residuals of the molybdate feed and replaced with an 8 wt.% solution of sodium sulfate and the pH adjusted to 2. A solution prepared by fusing sodium tungstate ($Na_2WO_4.2H_2O$) obtained from Mallinckrodt with sodium hydroxide to obtain a gel that was diluted to about 80 g/l of sodium tungstate and 210 g/l of sodium hydroxide. The solution was fed to the anolyte and the pH of the anolyte maintained at 2 to 3. A white to yellow substance separated and slowly formed into a solid that could be removed by decantation and the decantate returned to the anolyte. The electrodialysis was carried out without apparent problems. The yellow solid was washed with water, dried and analyzed to be substantially free of sodium. The solid appeared to be orthotungstic acid.

What is claimed is:

1. A process for the electrodialytic separation of an aqueous feed of a multivalent metal hydroxide and an alkali hydroxide into a solid multivalent metal hydroxide and a solution of an alkali hydroxide in an electrodialytic cell having an anolyte compartment and a catholyte compartment separated by a cation membrane having electro-conductive and electrotransport characteristics, comprising the steps of:
    a) placing an alkali hydroxide electrolyte solution in the anolyte and the catholyte compartments;
    b) connecting the anode and the cathode of the respective anolyte and catholyte compartments to an electrical source and supplying continuous direct current to provide electrotransport of alkali metal cations of the alkali hydroxide from the anolyte compartment to the catholyte compartment;
    c) supplying a continuous aqueous feed of a mixture of a multivalent metal hydroxide and an alkali hydroxide to the anolyte compartment at a rate to maintain desired alkali hydroxide weight percentage in the anolyte;
    d) removing a multivalent metal hydroxide precipitate from the anolyte compartment; and,
    e) removing alkali hydroxide solution from the catholyte compartment.

2. The process of claim 1 wherein said aqueous feed is a sol, gel, colloidal dispersion or solution of an alkali hydroxide and a multivalent metal hydroxide selected from hydroxides of multivalent metals that are substantially insoluble in water, and dilute solutions of alkali hydroxide.

3. The process of claim 1 wherein said electrolyte is an aqueous solution containing an alkali hydroxide selected from hydroxides of the alkali metals, and the anolyte contains a soluble anion of an acid to maintain the pH at a value less than the pH required to precipitate the multivalent metal hydroxide.

4. A process for the electrodialytic separation of an aqueous feed comprising at least two multivalent metal hydroxides and an alkali hydroxide into a solid multivalent metal hydroxide and a salt of a multivalent metal having an ionically mobile cation and a solution of an alkali hydroxide in an electrolyte comprising an anion of an acid in an electrodialytic cell wherein the pH of said electrolyte is continuously controlled by electrotransport of alkali cations from said electrolyte whereby a multivalent metal hydroxide is separated as a solid in said electrolyte and a multivalent meal hydroxide is converted to a salt having an ionically mobile multivalent metal cation in said electrolyte that can be electrotransported from said electrolyte and said alkali cations are converted to an alkali hydroxide.

5. The process of claim 4 wherein said feed is a sol, gel, colloidal dispersion or solution comprising an alkali hydroxide and at least two multivalent metal hydroxides selected from hydroxides of multivalent metals that form salts having ionically mobile cations at a different pH in an aqueous solution.

6. The process of claim 4 wherein said electrolyte is an aqueous solution comprising an anion of an acid selected from acids of sulfur, halogen, nitrogen, phosphorous and carbon which acid in a one normal solution would have a pH no greater than one and forms a water soluble salt with a multivalent cation.

7. The process using an electrodialytic cell for the electrodialytic separation of an aqueous feed of an alkali hydroxide and a multivalent metal hydroxide in a first aqueous solution to an anolyte in the first compartment of an electrodialytic cell into a solid multivalent metal hydroxide and solution of alkali hydroxide, which comprises the steps of:
 (a) passing an electric current through said electrodialytic cell and electrotransporting alkali cations from said first aqueous solution in a first anolyte compartment of said electrodialytic cell through a cation permeable membrane into a second catholyte compartment containing a second aqueous solution, and
 (b) introducing a soluble anion of an acid to the anolyte at a rate to control the concentration of alkali hydroxide or pH in said first aqueous anolyte solution whereby said multivalent metal hydroxide separates as a solid in said first aqueous solution, and an alkali hydroxide is generated in said second aqueous solution which is in electrical communication with the cathode of said electrodialytic cell.

8. The process of claim 7 wherein said aqueous feed is selected from a sol, gel, colloidal dispersion or solution comprising an alkali hydroxide and a multivalent metal hydroxide that is substantially insoluble in water or dilute solutions of alkali hydroxide.

9. The process of claim 7 wherein said first aqueous solution comprises an alkali hydroxide and a solid multivalent metal hydroxide.

10. The process of claim 7 wherein said first aqueous solution has a pH greater than nine.

11. The process of claim 7 wherein said feed is an alkali hydroxide etchant of aluminum or alloys of aluminum containing etched aluminum.

12. The process of claim 7 wherein said second aqueous solution is a solution of an alkali hydroxide.

13. The process of claim 11 wherein said solid multivalent hydroxide is aluminum hydroxide.

14. The process of claim 11 wherein said alkali hydroxide is sodium hydroxide.

15. A process using an electrodialytic cell for the electrodialytic separation of a feed comprising an alkali hydroxide and a multivalent hydroxide into a solid multivalent hydroxide and a solution of alkali hydroxide which comprising passing electric current through said electrodialytic cell having at least an anolyte compartment containing an anode and a first aqueous solution as an anolyte separated by a cation permeable membrane from a second compartment containing a second aqueous solution separated by a cation permeable membrane from a catholyte compartment containing a cathode and a catholyte of an aqueous solution of said alkali hydroxide and feeding said aqueous feed to said second aqueous solution and electrotransporting alkali cations from said second aqueous solution in said second compartment at a rate to control the concentration of alkali hydroxide or pH of said second aqueous solution whereby a multivalent metal hydroxide in said feed is separated as a solid in said second aqueous solution and said alkali cations electrotransported from said second aqueous solution are electrotransported to said catholyte and converted to said alkali hydroxide.

16. The process of claim 15 wherein said first aqueous solution contains an anion of an acid selected from acids of sulfur, halogen, nitrogen, phosphorous and carbon which acid in a one normal solution would have a pH no greater than 3.

17. The process of claim 15 wherein said feed to said second aqueous solution is selected from a sol, gel, dispersion or solution comprising an alkali hydroxide and a multivalent metal hydroxide that is substantially insoluble in water or dilute solutions of alkali hydroxide.

18. A process using an electrodialytic cell for the electrodialytic separation of an aqueous feed comprising two or more multivalent metal hydroxides and an alkali hydroxide into a solid multivalent metal hydroxide and a salt of multivalent metal cation and solution of an alkali hydroxide which comprising passing electric current through said electrodialytic cell having at least an anolyte compartment containing an anode and a first aqueous solution as an anolyte separated by a cation permeable membrane from a second compartment containing a second aqueous solution separated by a cation permeable membrane from a catholyte compartment containing a cathode and a catholyte of an aqueous solution of said alkali hydroxide and adding said feed to said first aqueous solution and electrotransporting alkali cations from said first aqueous solution through said cation permeable membrane into said second aqueous solution as a rate to control the pH of said first aqueous solution whereby a multivalent metal hydroxide is separated as a solid in said first aqueous solution and a multivalent metal hydroxide is converted to a salt in said first aqueous solution having an ionically mobile multivalent metal cation electrotransported from said first aqueous solution through said cation membrane into said second aqueous solution and ionically immobilized said alkali cations electrotransported from said first aqueous solution to said catholyte and converted to an alkali hydroxide.

19. The process of claim 18 wherein said aqueous feed is a sol, gel, dispersion or solution comprising an alkali hydroxide and at least two multivalent metal hydroxides selected from hydroxides that form salts having ionically mobile cations at a different pH.

20. The process of claim 18 wherein said first aqueous solution comprises an anion of an acid selected from acids of sulfur, halogen, nitrogen, phosphorous and carbon which acid in a one normal solution would have a pH no greater than three and forms a salt in said first aqueous solution having an ionically mobile multivalent metal cation.

21. The process of claim 18 wherein said multivalent metal hydroxides are hydroxides of ferric iron and copper.

22. The process of claim 17 wherein the pH of said first aqueous solution is greater than 2.

* * * * *